United States Patent [19]
Gilbert et al.

[11] Patent Number: 5,983,230
[45] Date of Patent: Nov. 9, 1999

[54] ORDERED SPARSE ACCUMULATOR AND ITS USE IN EFFICIENT SPARSE MATRIX COMPUTATION

[75] Inventors: John R. Gilbert, Palo Alto, Calif.; William W. Pugh, Jr, Silver Spring; Tatiana Shpeisman, Adelphi, both of Md.

[73] Assignee: Xerox Corporation, Stamford, Conn.

[21] Appl. No.: 08/573,708

[22] Filed: Dec. 18, 1995

[51] Int. Cl.$^6$ .................................................. G06F 17/00
[52] U.S. Cl. .......................... 707/101; 395/707; 395/708; 364/736.03
[58] Field of Search .................................... 395/601–602, 395/607–612, 621–622, 570–708; 364/800.11–800.16, 725.01–754.02; 707/1–206

[56] References Cited

U.S. PATENT DOCUMENTS

| | | | |
|---|---|---|---|
| 4,787,057 | 11/1988 | Hammond | 364/754 |
| 5,392,429 | 2/1995 | Agrawal et al. | 395/650 |
| 5,557,710 | 9/1996 | Amdursky et al. | 395/119 |

OTHER PUBLICATIONS http://sandbox.parc.xerox.com//gilbert.
http://www.cscfi/Mail/NANET/msg00066.html, Jan. 28, 1994.

Gilbert et al., "Sparse Matrices In MATLAB: Design and Implementation," SIAM Journal on Matrix Analysis and Applications, pp. 333–357, Jan. 1992.

Aho, A.V.;Hopcroft, J.E.; and Ullman, J.D. "The Design and Analysis of Computer Algorithms." Addison–Wesley Series in Computer Science and Information Processing, Oct. 1975, © 1974, pp. 87–92, 146, 166–167.

Demmel, J.W.; Eisenstat, S.C.; Gilbert, J.R.; Li, X.S. and Liu, J.W.H. "A Supernodal Approach to Sparse Partial Pivoting." CSL–P95–3, Sep. 1995, [P95–00313], © 1995 Xerox Corporation.

Gilbert, J.R. and Peierls, T. "Sparse Partial Pivoting in Time Proportional to Arithmetic Operations." SIAM J. SCI. STAT. COMPUT., vol. 9, No. 5, Sep. 1988, pp. 862–874.

Pugh, W. "Skip Lists: A Probabilistic Alternative To Balanced Trees." Communications of the ACM, Jun. 1990, vol. 33, No. 6, pp. 668–676.

Tarjan, R.E. "Data Structures and Network Algorithms." Society for Industrial and Applied Mathematics, 1983, pp. 33–43, 48–53.

*Primary Examiner*—Wayne Amsbury
*Assistant Examiner*—David Yink Jung

[57] ABSTRACT

A data structure, called an ordered sparse accumulator (Ordered SPA), permits sequencing in numeric order by index and dynamic alteration of the nonzero structure of the active column in sparse matrix computations during the sequencing operation.

5 Claims, 5 Drawing Sheets

```
for column j=1 to n do
    Update:
        for k=1 to j-1 do
            A(k+1:n,j) = A(k+1:n,j) -A(k,j) * L(k+1:n,k)
        end
    Pivot: for A, L, and U, interchange rows j and f,
        where abs (A(f,j)) = max(abs(A(j:n,j)))
    Separate L and U: U(1:j,j) = A(1:j,j); L(j+1:n,j) = A(j+1:n,j)
    Divide: L(:,j) = L(:,j)/A(j,j)
end
```

```
for k=1 to j-1 do
    A(k+1:n,j) = A(k+1:n,j) -A(k,j) * L(k+1:n,k)
end
```

```
function [L,U,P] = lu (A);
n = max(size(A)); L = zeros(n,n); U = zeros(n,n)
P = [1:n];
begin
    view A, L, U through (P,:)
    for j = 1:n
        SPA t;
        view t through P;
            t = A(:,j);
            for nzs k in order in t(1:j-1)
                t = t-t(k) * L(:,k);
            end;
            [v,piv] = max(abs(t(j:n)));
            piv = piv + j - 1;
            P([j,piv]) = P([piv,j]);
            L(:,j) = t(1:j-1);
            U(:,j) = t(j:n);
            L(:,j) = L(:,j)/v;
    end;
L = L(P,:); U = U(P,:);
```

FIG. 4

```
void lu(SparseMatrix &A, SparseMatrix &L, SparseMatrix &U, Permutation &P) {
  int n = A.size(); L.set_size(); U.set_size(n,n);
  SPA t;
  SparseVector c = A.get_column(j, NoPermutation, NoRange);
  load(t, NoPermutation, NoRange, c, NoPermutation, NoRange);
  Enumerator e(t, P, Range(1, j-1));
  for (k = e.get_first(); k! = 0; k = e.get_first( ))
    dpaxpy(t, NoPermutation, NoRange,
           A.get_column(k), NoPermutation, NoRange,
           -t.get_value(k, P, NoRange));
  int piv; Value v;
  findMaxAbs(t, P, Range(j,n), piv, v);
  P.swap(j, piv);
  split(t, P, NoRange, L.get_column(j), P, NoRange, U.get_column(j), P, NoRange, j);
  divide(L.get_column(j), P, NoRange, v);
  L.permute(P);
  U.permute(P);
}
```

FIG. 5

ORDERED SPARSE ACCUMULATOR AND ITS USE IN EFFICIENT SPARSE MATRIX COMPUTATION

BACKGROUND OF THE INVENTION

Computation with sparse matrices is at the heart of a wide range of applications in computational science and modeling. Many sparse matrix algorithms use an active column (or active row, or group of active columns or rows) in which a major part of the numerical computation takes place. The requirements for representing and manipulating the active column typically differ from the requirements for an entire sparse matrix in two ways:

More flexible and efficient access is required to the active column than to the whole matrix. For example, it may be necessary to sequence through the nonzero elements of the active column, and also to access individual elements at random.

The active column is a relatively small part of the data used in the computation, so the requirement to conserve space in its representation is not as stringent as it is for the larger data structures.

A structure called the sparse accumulator, or SPA, has been used to represent an active column by several workers, including Gilbert, Moler, and Schreiber, "Sparse Matrices in Matlab: Design and Implementation", SIAM Journal on Matrix Analysis and Applications, 13:333–356, 1992. The SPA permits random access to individual elements, and sequencing through individual elements, both in constant time per element accessed. In the sequencing operation, the nonzero elements cannot be accessed in numerical order by index; and the nonzero structure of the SPA cannot be altered during the sequencing operation.

SUMMARY OF THE INVENTION

This invention provides a data structure, called an ordered sparse accumulator (Ordered SPA), which permits sequencing in numeric order by index and dynamic alteration of the nonzero structure of the active column in sparse matrix computations during the sequencing operation.

BRIEF DESCRIPTION OF THE DRAWINGS

Further objects and advantages of this invention will be evident when the following detailed description is read in conjunction with the attached drawings, in which:

FIG. 4 shows LU factorization written in the high-level language AML;

FIG. 5 shows the C++ library calls into which the AML code in FIG. 4 is transformed.

DETAILED DESCRIPTION

While the invention is described in some detail hereinbelow with reference to a particular embodiment, it is to be understood that the intent is not to limit it to this embodiment. On the contrary, the intent is to cover all modifications, alternatives and equivalents falling within the spirit and scope of the invention as defined by the appended claims.

The detailed description is organized as follows: Section 1 describes the representation of the ordered SPA and the implementation of its operations. Section 2 describes the use of the ordered SPA in sparse LU factorization, and includes experimental results demonstrating its efficacy. Section 3, in turn, summarizes other possible uses for the ordered SPA.

1.0 The Ordered Sparse Accumulator (Ordered SPA)

As described above, the ordered SPA supports both random access to individual elements and sequential access to nonzero elements in numerical order by index, even when the creation of new nonzero elements is interleaved with the sequence of accesses. The implementation consists of a combination of the SPA of Gilbert, Moler, and Schreiber (cited above) and an ordered-set representation as described in, for example, Aho, Hopcroft, and Ullman, The Design and Analysis of Computer Algorithms, Addison-Wesley 1975. Section 1.1 provides details of one representation of the ordered SPA, and Section 1.2 provides details of the operations using that representation. Section 1.3 summarizes extensions and alternatives to this representation.

1.1 Representation of an Ordered SPA

Figure 1:
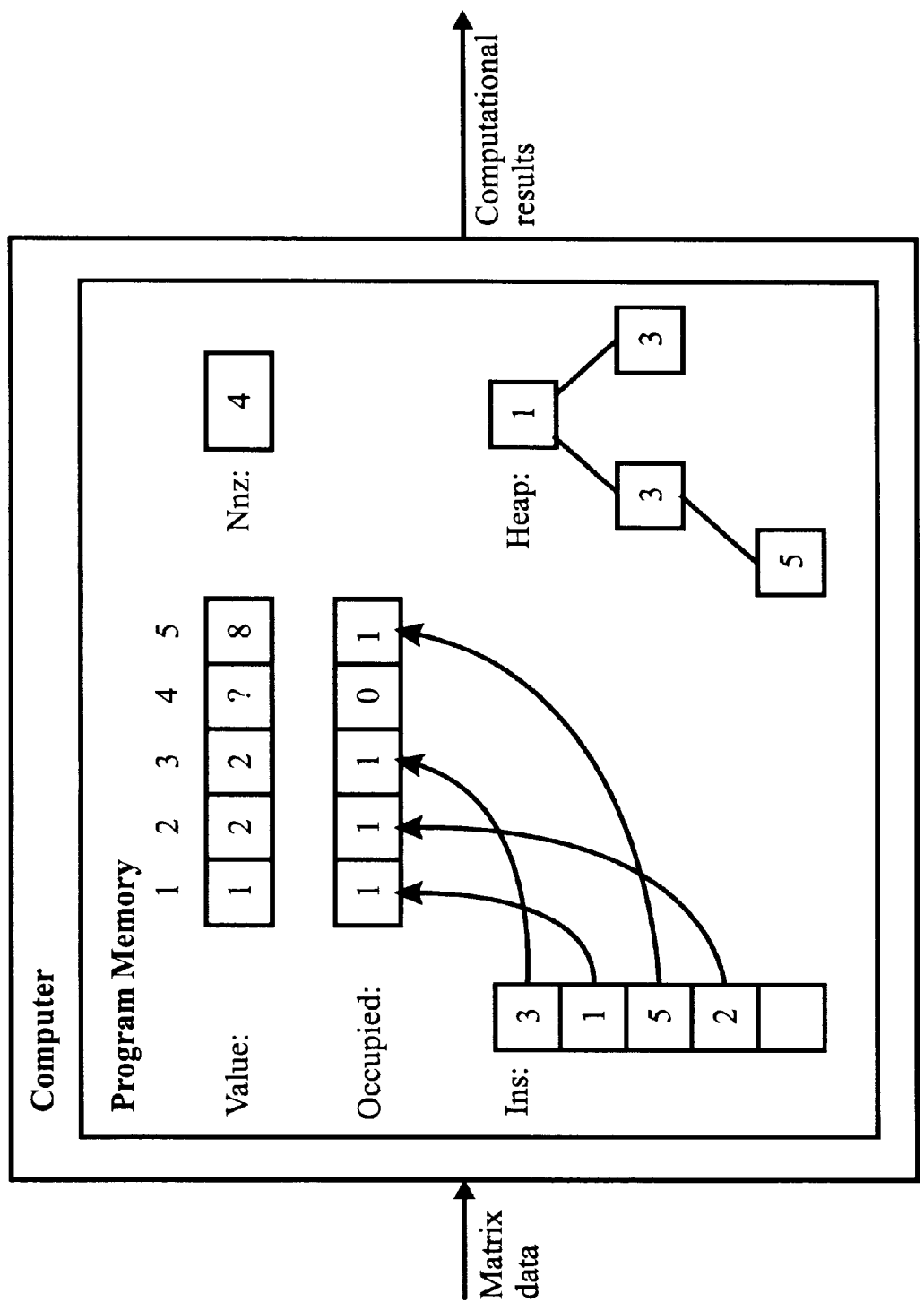
FIG. 1 illustrates an implementation of an ordered SPA that is constructed in accordance with this invention.

FIG. 1 shows the elements that make up one representation of an ordered SPA. This ordered SPA represents a column vector v. Denote the dimension of the vector by n. As illustrated the ordered SPA for the column vector v contains:

An array value 21 of n elements, in which value(i)=$v_i$ whenever $v_i$ is nonzero.

An array occupied 22 of n elements, in which occupied(i)=0 whenever $v_i$ is zero, and occupied(i) is nonzero whenever $v_i$ is nonzero.

An integer nnz whose value is the number of nonzero entries in the vector v.

An array ins 24 with room to store at most n elements, whose first nnz elements are the indices of the nonzero elements of v.

A heap 25 of nnz elements, which contains the indices of the nonzero elements of v, represented as a binary tree in which the smallest index is at the root, and each child contains a smaller index than its parent. This tree is maintained dynamically as additional indices are added to it.

As described in Section 1.3, any other representation for an ordered set may be substituted for the heap 25.

1.2 Operations on an ordered SPA

The operations on an ordered SPA include the following:

Initialization: create an ordered SPA of specified dimension n, with nnz=0 and all entries in the occupied array 22 equal to 0.

Access value in ordered SPA at specified index i: if occupied(i) is 0, return 0; otherwise, return value(i).

Set specified value at specified index i in ordered SPA: set value(i) as specified. If occupied(i) is 0, set occupied(i) to 1, increment nnz, append index i to array ins 24, and insert index i into the heap 25; see Aho et al. (cited above) for more details on updating heaps.

Load SPA: Set all the values of the ordered SPA from a specified vector, which may be represented as a full vector, a compressed sparse vector, or another SPA.

Store SPA: Copy the values of the ordered SPA to a full vector, a compressed sparse vector, or another SPA.

Operate on SPA: These operations take a vector (which may be full, sparse, or another spa), and/or a scalar, and perform an arithmetic or logical operation between that vector and/or scalar and the SPA, leaving the result in the SPA. They include (but are not limited to) adding a vector to the SPA; multiplying the SPA by a scalar; adding a scalar multiple of a vector to the SPA.

Iterate through SPA: This consists of three operations getfirst, getnext, and last, which use the heap 25 to iterate through ("enumerate," see FIG. 5.) the indices of the nonzero elements in increasing order of index. getfirst returns the first nonzero index; last returns true if there are no more nonzero indices to iterate through; and (if last returns false) getnext returns the next nonzero index. Optionally, in keeping with the standard process for enumerating a heap, getfirst may delete its index from the ordered set. In that event, getnext is fully implemented by getfirst during the enumeration, such as shown in FIG. 5 at line 7.

1.3 Alternate Representations

As will be appreciated, the ordered SPA of this invention may be used to represent a row vector instead of a column vector. Further, the ordered SPA may represent a set of columns (such as a panel or supernode); in this case, the arrays occupied 22 and value 21 are two-dimensional, and the array ins 24 and the heap 25 contain all the indices that are nonzero in any row in the set of columns. Similarly, the ordered SPA may represent a set of rows.

Any representation of an ordered set may be used in place of the heap 25; examples include a skip list, a 2–3 tree, an AVL tree, or a red-black tree. Even more generally, the heap 25 is an example of a dynamically updated data structure which is organized in accordance with the numeric sequence of the positions within an array that contain nonzero values at any given time.

The ordered SPA may be augmented with a generation count, which is a nonnegative integer that is set to 1 when the ordered SPA is first initialized. In this case, occupied (i)=generation if and only if $v_i$ is nonzero. With this representation, the ordered SPA may be reset to zero in constant time by incrementing the generation count and setting nnz to 0.

The requirement that $v_i$ be nonzero if occupied(i) is nonzero may be relaxed. In this case, the ordered SPA can explicitly represent some zero elements of the vector v.

2.0 Use of an Ordered SPA in Sparse LU Factorization

This section illustrates the use of the ordered SPA in an efficient method to compute the LU factorization, with partial pivoting, of a sparse matrix. The algorithm used is a "left-looking" column-oriented algorithm; see for example Gilbert and Peierls, "Sparse partial pivoting in time proportional to arithmetic operations," SIAM Journal on Scientific and Statistical Computing 9:862–874, 1988, for a description of left-looking LU factorization algorithms.

Figures 2, 3:
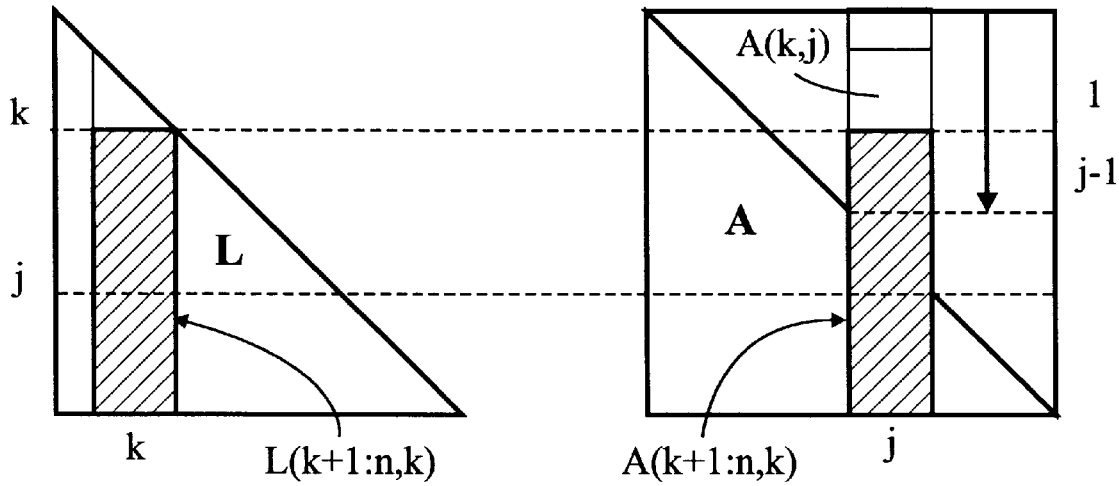
FIG. 2 illustrates an abstract description of LU factorization.
FIG. 3 illustrates the update step of LU factorization.

FIG. 2 illustrates an abstract description of the LU factorization. The main loop is over the columns of the matrix; each iteration computes one column of the factors L and U. The most computationally expensive part of the computation is the Update step, which is shown in more detail in FIG. 3. The update step is itself a loop over columns to the left of the current (i.e. active) column. At each iteration of this loop, the active column is updated by subtracting from it a multiple of one of the columns to its left. Although the loop runs over all values of k from 1 to j-1, the update is empty if the element A(k,j) is zero. Thus, for efficiency, the loop should only run over the nonzero elements of column j of A. Since this column is changing during the loop, it will be necessary to use an ordered SPA representation for it.

FIG. 4 shows the LU factorization written in AML, a language which is described in a concurrently filed U.S. patent application of Gilbert et al. (D/95591). This program specifies the use of an ordered SPA.

FIG. 5 shows the C++ library calls into which the AML code in FIG. 4 is transformed. More particularly, as shown in FIG. 5 by the "for" loop for the enumerator, e, this application uses a version of the ordered spa in which the indices in the ordered set data structure are removed as they are enumerated. This follows from the fact that both the initial and the incremental accesses to the ordered set are performed by "get_first ( )," as described in Section 1.2 above with respect to the optional technique for performing the "interate through SPA" process.

Figure 6:
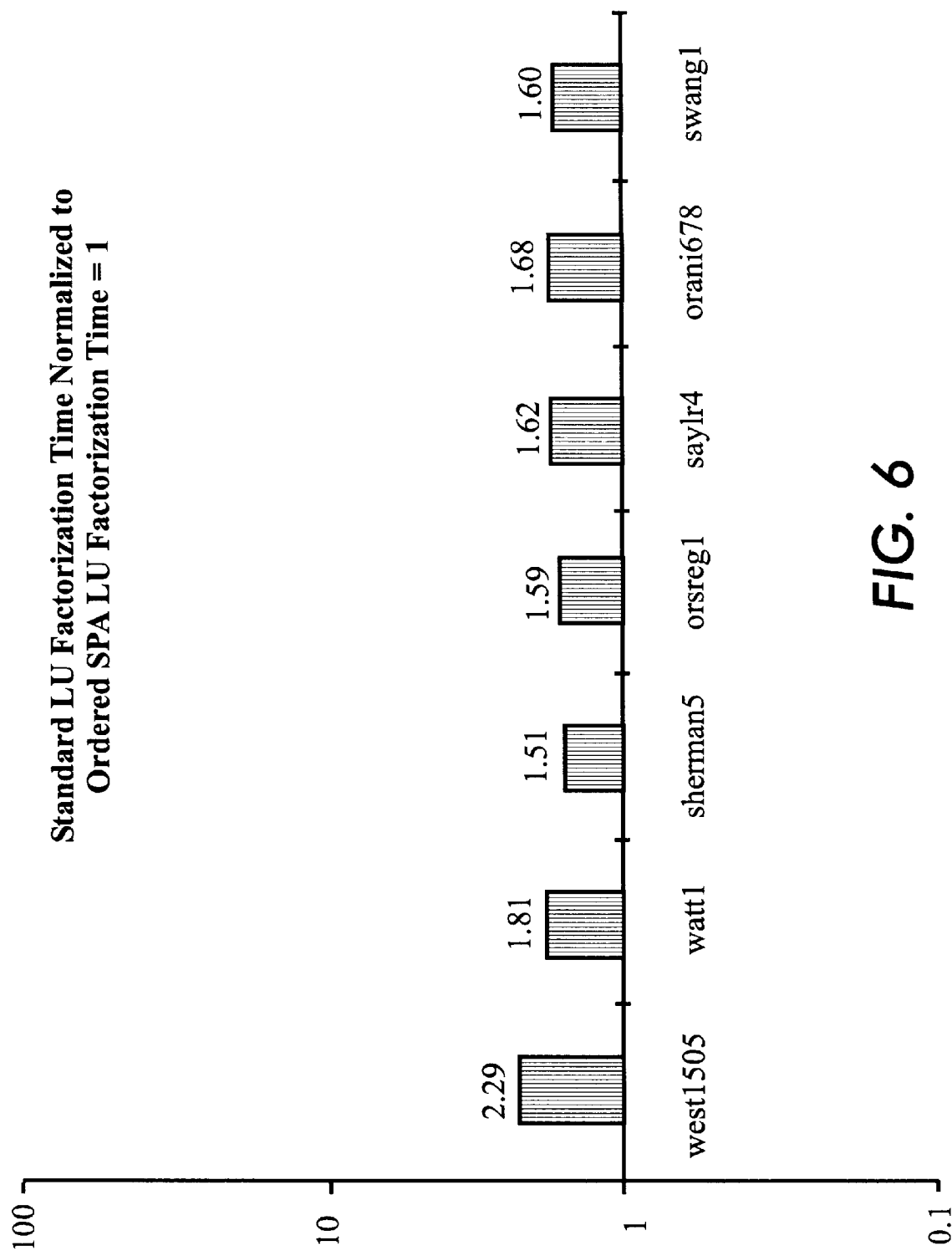
FIG. 6 illustrates comparative experimental results that were conducted to measure the efficiency of the AML LU factorization code that uses the ordered SPA.

FIG. 6 shows the results of an experiment to measure the efficiency of the LU factorization code using the ordered SPA, compared to a standard sparse LU factorization code. The standard for our comparison is the sparse LU factorization code, written in C, which is built into Matlab, as described in Gilbert, Moler, and Schreiber (cited above). The latter code uses an algorithm due to Gilbert and Peierls (cited above). It uses an unordered SPA, and avoids the addition of new nonzeros during the inner loop by using a complicated special-purpose depth-first search technique to predict the locations of the nonzeros before operating on the SPA. The ordered SPA code is written in C++. Since these languages are very similar, it is believed that the bulk of the difference between the timings of the two codes is attributable to the use of the ordered SPA.

The figure shows timing results for each of seven sparse matrices from the Harwell-Boeing sparse matrix test collection. For each matrix, a bar shows the ratio of the standard code's running time to the running time of our ordered SPA code (on a Sun SparcStation 20 computer). Thus, a bar extending upward would indicate that the ordered SPA code was faster, and a bar extending downward would indicate that the ordered SPA code was slower.

The ordered SPA code ranges from slightly faster to about 2.3 times as fast as the standard code for these matrices. We conclude that the ordered SPA allows a sparse LU factorization to run at least as efficiently as a complicated special-purpose method intended solely for this application.

3.0 Other Uses of Ordered SPA

The ordered SPA may be used for efficient solution of sparse triangular linear systems; see Gilbert and Peierls (cited above) for a description of such systems.

An ordered SPA with more than one column may be used for LU factorizations in which panel updates are used to reduce traffic between cache and main memory. See Demmel, Eisenstat, Gilbert, Li, and Liu, "A supernodal approach to sparse partial pivoting," Xerox PARC technical report CSL-95-3, 1995, for a description of one such LU factorization.

An ordered SPA may be used in low-rank updates of triangular factorizations, such as are used (for example) in the simplex method for linear programming or in updating or downdating QR factorizations.

An ordered SPA may be used in efficiently computing incomplete triangular factorizations, as are used (for example) in constructing preconditioners for iterative methods for the solution of sparse systems of linear equations.

An ordered SPA may be used in LU factorization on parallel machines, because it removes the necessity for the Gilbert/Peierls depth-first search step (which it may not be possible to perform efficiently on a parallel machine).

What is claimed:

1. In a combination of logically linked data structures in a computer memory for use in performing matrix computations on an n-element long active submatrix of an element indexed sparse matrix; the data structures including an n-element long memory array for storing any nonzero values in the submatrix; the improvement comprising a stored data structure representation of matrix indices for elements of the submatrix that have nonzero values, another n-element long memory array for storing logical indicators ordered in accordance with matrix indices of elements of the submatrix, with each logical indicator correspondingly positioned in index order with any element of the submatrix having a nonzero value set to a TRUE state; and a further n-element memory array for storing a representation of the matrix indices for any elements of the submatrix that have taken on a nonzero value in an order corresponding to order of acquisition of the nonzero value by elements of the submatrix.

2. The improvement of claim 1 wherein matrix computations are performed on active submatrices up to m elements wide;

the data structures for storing ordered values and logical indicators are m elements wide; and representations of matrix indices represent at least all the matrix indices for any submatrix elements having nonzero values.

3. The improvement of claim 1 wherein the stored data structure representation has a tree-like organization.

4. The improvement of claim 3 wherein the stored data structure representation is organized in increasing order of indices.

5. The improvement of claim 4 wherein the stored data structure representation is a heap.

* * * * *

UNITED STATES PATENT AND TRADEMARK OFFICE
CERTIFICATE OF CORRECTION

| | | |
|---|---|---|
| PATENT NO. | : 5,983,230 | Page 1 of 1 |
| APPLICATION NO. | : 08/573708 | |
| DATED | : November 9, 1999 | |
| INVENTOR(S) | : John R. Gilbert et al. | |

It is certified that error appears in the above-identified patent and that said Letters Patent is hereby corrected as shown below:

Column 1, line 4, insert as a new paragraph:

This invention was made with Government support under 70NANB5H1026 awarded by DoC / NIST. The Government has certain rights in this invention.

Signed and Sealed this

Twenty-eighth Day of October, 2008

JON W. DUDAS
*Director of the United States Patent and Trademark Office*